Feb. 21, 1933.   F. C. ASTON   1,898,517
AUTOMOBILE HEADLIGHT BULB CAP
Filed Aug. 18, 1931
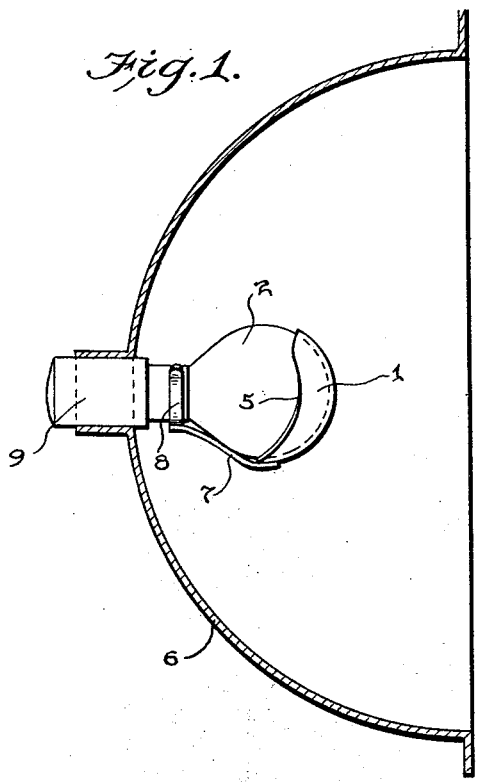
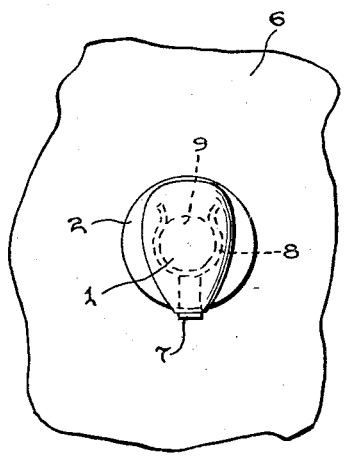
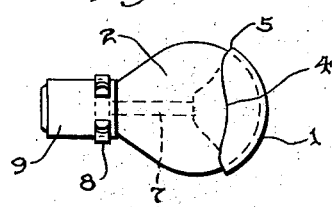
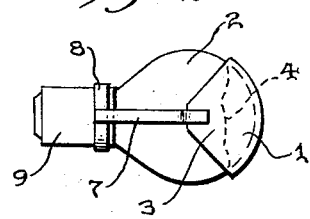
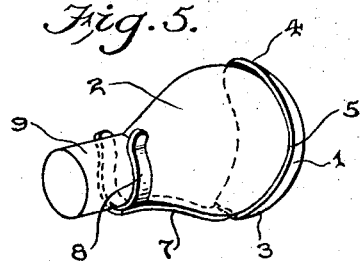
Inventor
F. C. Aston,
By
Attorney Patented Feb. 21, 1933

1,898,517

UNITED STATES PATENT OFFICE

FREDERICK C. ASTON, OF PITTSBURGH, PENNSYLVANIA

AUTOMOBILE HEADLIGHT BULB CAP

Application filed August 18, 1931. Serial No. 557,919.

The invention relates to an automobile headlight bulb cap.

Heretofore the various types of bulb caps which have been constructed have not been entirely satisfactory due to the fact that they do not diffuse the light properly, but simply act as a shield by covering the light bulb at one end, with apparently the only object in view being to prevent the intense or direct light of the bulb filament from glaring into the eyes of an approaching motorist.

The principal object of the present invention is to provide for automobile headlight bulbs a simple, practical and efficient cap of strong, durable and comparatively inexpensive construction designed and arranged to reflect and deflect the light of the bulb in such a manner as to give a more efficient light than the ordinary shielded bulb, and at the same time, effectively eliminate the glare to an approaching automobile.

A further object of the invention is to eliminate the light ordinarily reflected upward above the line of vision by automobile headlights, which upwardly reflected light has a tendency to obscure the road vision of the driver, particularly in a rain, mist or fog, and thereby enable the driver of an automobile, by the elimination of such upwardly directed rays, to proceed with a greater degree of safety when such atmospheric conditions exist.

Another object of the invention is to afford a broader vision of the road than is afforded by the ordinary processed light bulbs or other shielded light bulbs by utilizing horizontally and downwardly directed rays of light ordinarily shielded or excluded by prior devices of this character.

With these and other objects in view, the invention consists in the construction and novel combination and arrangement of parts hereinafter described, illustrated in the accompanying drawing, and set forth in the claims hereto appended, it being understood that various changes in the form, proportion and minor details of construction, within the scope of the claims, may be resorted to without departing from the spirit of the invention or sacrificing any of the advantages thereof.

In the drawing:—

Figure 1 is a side elevation of an automobile headlight bulb cap constructed in accordance with this invention and shown applied to a light bulb, the reflector of the headlight being shown in section.

Fig. 2 is a front elevation of the same, the reflector being broken away.

Fig. 3 is a plan view of the automobile headlight bulb caps shown applied to a light bulb.

Fig. 4 is a reverse plan view of the same.

Fig. 5 is a perspective view of the light bulb and bulb cap looking from the rear.

In the accompanying drawing in which is illustrated the preferred embodiment of the invention, 1 designates a substantially concavo-convex automobile light bulb cap designed to be constructed of stainless steel, kromoloid metal or other suitable material, and snugly fitting the outer or front end of a light bulb 2 and extending downwardly over the front of the light bulb from the top portion thereof to the bottom of the same and rearwardly along the bottom to a point in rear of the top portion of the light bulb, as clearly illustrated in the drawing. The concavo-convex bulb cap forms a shield for preventing the intense or direct light from the light bulb from glaring into the eyes of an approaching motorist and the top portion of the bulb cap extends rearwardly a sufficient distance to prevent any of the direct rays from the light bulb from passing out of the reflector at the top thereof so that the direct rays from the light bulb are entirely cut off from the top to the bottom of the bulb.

As illustrated in Fig. 2 of the drawing, the automobile headlight bulb cap is approximately egg-shaped in front elevation being wider at the top and tapering towards the bottom, the bottom portion 3 which extends beneath the light bulb being approximately triangular, as clearly illustrated in Fig. 4 of the drawing. The upper edge 4 which extends transversely of the headlight bulb at the top thereof is cut away as shown in Fig. 3 to form a substantially arc-shaped recess to permit a maximum number of light rays to pass directly from the filament of the light bulb to the top of the headlight reflector and be reflected downwardly and outwardly.

Also the side edges 5 of the automobile headlight bulb cap are cut away below and spaced from the top portion of the cap to provide substantially arc-shaped recesses which permit a maximum number of rays of light to impinge against the sides of the reflector 6 of the headlight, thereby providing a broader vision of the road than would be afforded by an ordinary symmetrical headlight cap.

The automobile headlight cap extends rearwardly beneath the filament of the light bulb sufficiently to prevent rays of light therefrom reaching the lower portion of the reflector and being reflected upwardly by the automobile headlight reflector. By this particular construction of headlight bulb cap an inclined off center shield is provided which not only prevents the direct rays from the filament of the light bulb from glaring into the eyes of an approaching motorist, but upwardly directed light rays which might obscure the vision of a driver during rainy, misty or foggy weather, are completely eliminated while at the same time, a maximum elimination of the reflector and a more efficient light are afforded by the top and side raised portions of the shield. In addition to a more efficient light than the ordinary shielded light, the present invention has the advantage of affording a broader vision of the road and the shield may be more accurately and scientifically constructed than is possible with so-called processed light bulbs which are coated, as it is more or less difficult to accurately confine the coating to the area designed to be shielded by the coating of a processed light bulb.

The tapered approximately triangular portion 3 at the bottom of the bulb cap is connected to a supporting arm 7 consisting of a narrow strip of metal provided at its inner or rear end with a resilient clip 8 composed of spring arms embracing the shank portion 9 of the light bulb and adapted to be readily sprung into and out of engagement with the same to place the bulb cap on the bulb and to remove it therefrom. The detachable connection of the metallic bulb cap to a bulb enables it to be used indefinitely and by constructing the automobile headlight bulb cap of metal, such as stainless steel or kromoloid metal, a much whiter light is afforded and a shield of indefinite duration and universal in its application to any present automobile headlight is provided.

What is claimed is:

1. An automobile headlight bulb cap consisting of a concavo-convex metallic reflecting shield constructed for co-operative arrangement with respect to and in front of a light bulb and means for holding said reflecting shield in operative position, which reflecting shield is in the shape of a segment of a spherical shell and has a wide top portion adapted to extend rearwardly over the bulb when in place but which terminates ahead of the transverse vertical plane through the lamp filament or central portion of the light bulb, the bottom portion of the reflecting shield being triangular and extending beneath the lamp filament or central portion of the light bulb and terminating at a point substantially beneath said central portion of said light bulb, the side edges of the reflecting shield being defined by substantially vertically extending planes which intersect each other approximately along a vertically extending line that passes through the lamp filament or center of the lamp.

2. An automobile headlight bulb cap consisting of a concavo-convex metallic reflecting shield constructed for cooperative arrangement with respect to and in front of a light bulb and means for holding said reflecting shield in operative position, which reflecting shield is in the shape of a segment of a spherical shell and has a wide top portion adapted to extend rearwardly over the bulb when in place but which terminates ahead of the transverse vertical plane through the lamp filament or central portion of the light bulb, the bottom portion of the reflecting shield being triangular and extending beneath the lamp filament or central portion of the light bulb, the side edges of the reflecting shield being defined by substantially vertically extending planes which intersect each other approximately along a vertically extending line that passes through the lamp filament or center of the lamp.

In testimony whereof I have hereunto set my hand at Pittsburgh, Pennsylvania, this 10 day of August 1931.

FREDERICK C. ASTON.